Fig-1

Oct. 22, 1935.   W. H. WATKINS ET AL   2,017,998
MACHINE FOR FORMING HOLLOW GLASS ARTICLES
Filed May 15, 1934   6 Sheets-Sheet 2

C. C. Kinker
and
William H. Watkins
INVENTORS

BY J. F. Rule
ATTORNEY

Oct. 22, 1935. W. H. WATKINS ET AL 2,017,998
MACHINE FOR FORMING HOLLOW GLASS ARTICLES
Filed May 15, 1934    6 Sheets-Sheet 4

Patented Oct. 22, 1935

2,017,998

UNITED STATES PATENT OFFICE 2,017,998

MACHINE FOR FORMING HOLLOW GLASS ARTICLES

William H. Watkins, San Francisco, Calif., and Clarence C. Kinker, Alton, Ill., assignors to Owens-Illinois Glass Company, a corporation of Ohio Application May 15, 1934, Serial No. 725,718

13 Claims. (Cl. 49—9)

The present invention relates to improvements in machines for forming hollow glass articles and more particularly to means for producing bottles having "reentrant" or "pushup" bottoms, such for example, as wine and champagne bottles.

An object of the present invention is the provision of novel means insuring accurate centering of the reentrant portion and uniform depth thereof.

A further object is the provision of novel mechanism of the above character particularly adaptable for use in conjunction with automatic forming machines of the well known "Lynch" and "O'Neill" type.

Other objects will be in part apparent and in part pointed out hereinafter.

In the drawings:

Figs. 3 to 9, both inclusive, are sectional elevational views illustrating the successive steps involved in transferring a blank or parison to the finishing mold, transforming the blank into a bottle, and removing the bottle from the finishing mold.

Figs. 12, 13, and 14 show another means for raising the mold bottom plates at the blank transferring station.

While the present invention may be embodied in other types of machines, it is for illustrative purposes shown in conjunction with a Lynch machine such as disclosed in Lynch Patent No. 1,787,-635 granted January 6, 1931, to which patent reference may be made for details which have been omitted in the instant application and in fact form no part of our invention.

Figure 1:
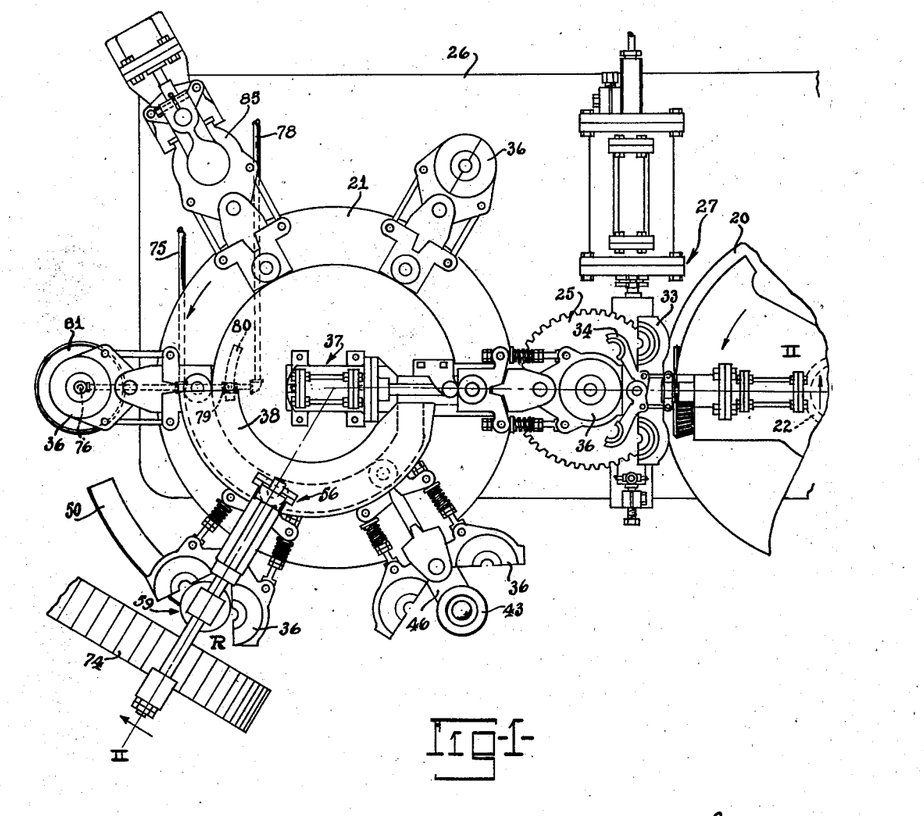
Fig. 1 is a fragmentary plan view of a "Lynch" type machine embodying the present invention.
Figure 2:
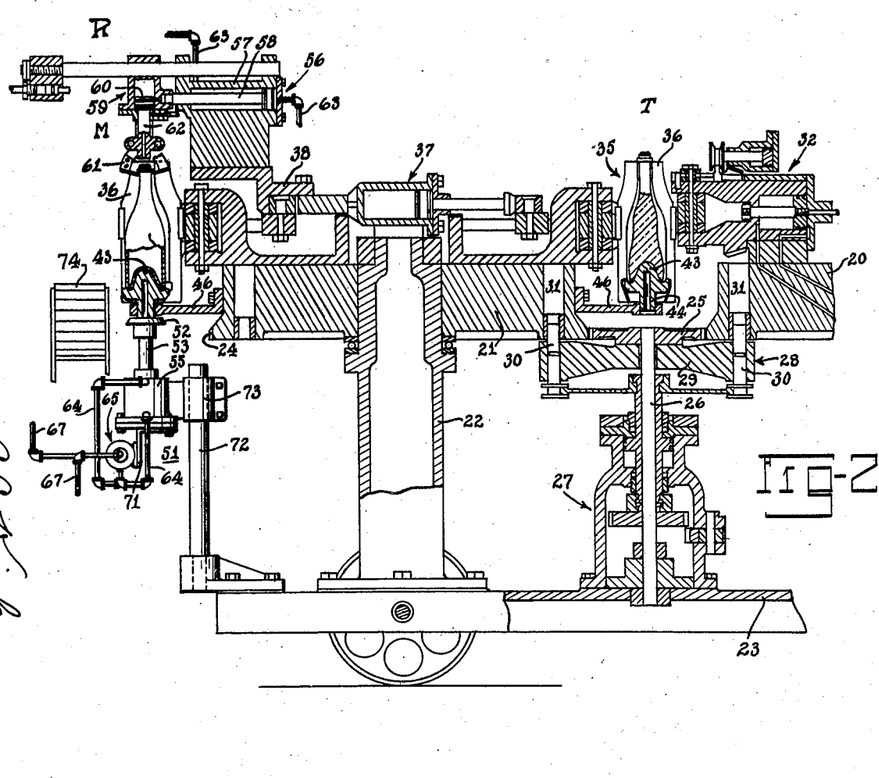
Fig. 2 is a vertical sectional view taken substantially along the line II—II of Fig. 1.
Figure 3:
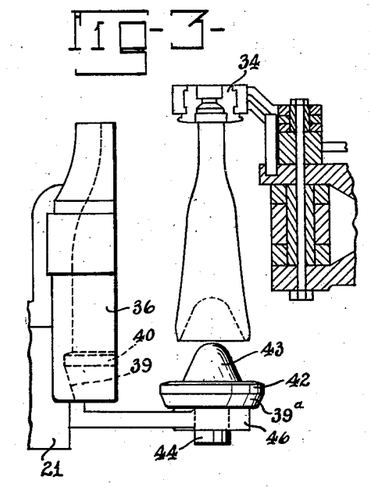
Fig. 3 is a detail view showing the parison suspended from the neck mold and about to be enclosed in the finishing mold.
Figure 4:
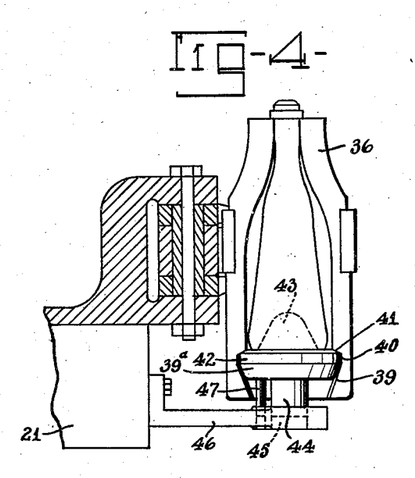
Fig. 4 is a view showing the parison or blank enclosed in the finishing mold.
Figure 5:
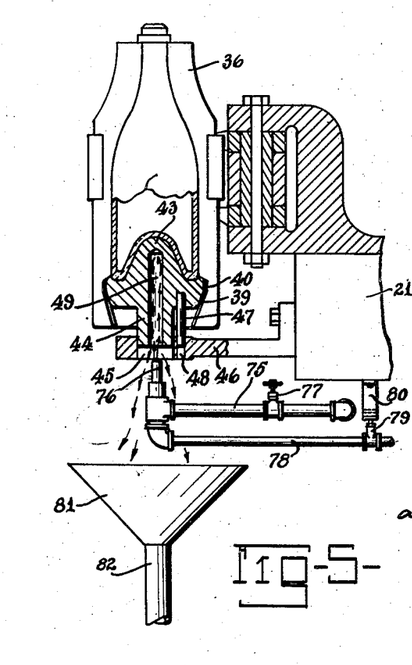
Fig. 5 shows the parison expanded and a cooling medium being applied to the mold bottom plate.
Figure 6:
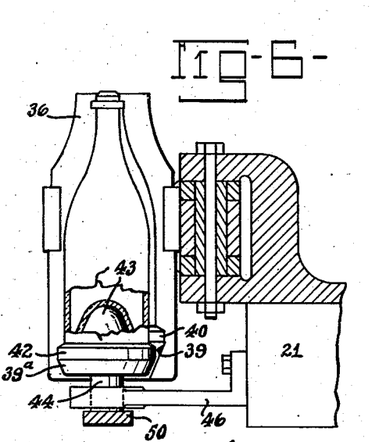
Fig. 6 is a view showing the finishing mold partially opened and the finished bottle resting upon the mold bottom plate.
Figure 7:
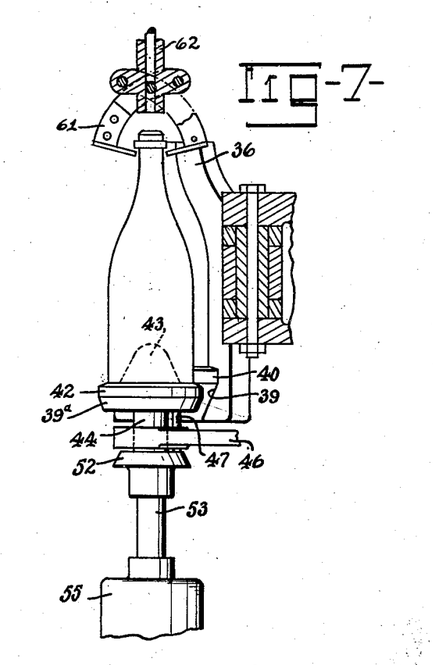
Fig. 7 shows the finishing mold at the article removing station completely opened and the bottom plate suported by the elevating mechanism.
Figure 8:
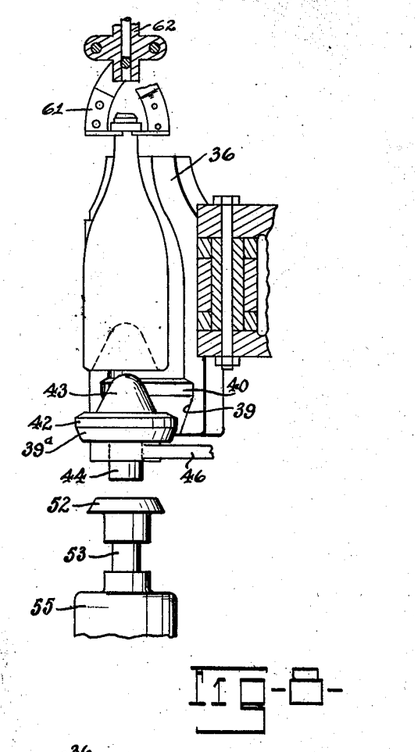
Fig. 8 is a view similar to Fig. 7 showing the bottom plate in its lowermost position and take-out mechanism supporting the bottle above said bottom plate.
Figure 9:
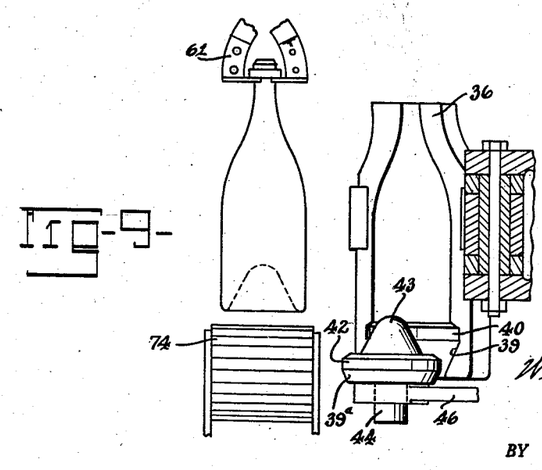
Fig. 9 shows the bottle completely removed from the finishing mold and suspended over the machine conveyor.

Briefly, the forming machine consists of a blank mold table 20 and finishing mold table 21 arranged side by side and rotatively mounted upon vertical columns 22 rising from a wheeled base 23. These tables include ring gears 24 meshing with a driving pinion 25 arranged between and on a center line extending through the axes of said tables, said pinion being connected to the upper end of a vertical shaft 26 which in turn is operatively connected to driving mechanism 27, the latter being of conventional form and functioning to impart a step-by-step movement to the pinion 25 and mold tables. Table locking mechanism 28 (Fig. 2) operates automatically to secure the tables against premature movement at regular time intervals. This mechanism may well be of the form shown in the above identified Lynch patent and includes a cross-head 29 carrying upstanding locking pins 30 designed for projection into vertical openings 31 in the mold tables, said openings being individual to the molds.

The blank mold table may, as in the well known Lynch machine, carry an annular series of invertible blank mold units 32, each including a partible body mold 33 and partible neck mold 34. The finishing mold table 21 carries an annular series of finishing mold units 35 each including a partible two section mold 36 and mechanism for opening and closing said molds. A horizontal piston motor 37 (Figs. 1 and 2) closes the finishing molds at the blank transferring station "T." A stationary cam 38 operates to open the finishing molds as they approach the article removing station "R."

The present invention as embodied in a machine of the above character and providing for elevation of the bottom plate solely due to its engagement with the corresponding finishing mold during closing thereof and supporting of the plate against appreciable dropping during and immediately following opening of the finishing mold, involves substantially the following construction. Each finishing mold immediately below the end of the cavity wall is formed with a downwardly converging cam surface 39 which extends through the lower end of the mold and at its upper end joins a circular surface 40 disposed concentric with the axis of the mold, the latter surface then meeting the lower margin of an upwardly converging surface 41. These surfaces are designed for engagement with correspondingly formed surfaces extending about the periphery of the mold bottom plate 42. Thus closing of the mold about said plate, involving engagement of these several converging surfaces, elevates the latter to its uppermost position.

Each bottom plate 42 includes in addition to the disk-like body provided with said tapered or converging surfaces, an upstanding projection 43 or plunger which functions to create the reentrant or "pushup" bottom in the finished article. A guide member 44 arranged axially of the bottom plate and depending therefrom is slidingly fitted into a vertical guide opening 45 in a bottom plate supporting arm 46 extending radially from the finishing mold table 21. A pin 47 may be arranged alongside of the guide member 44 and attached to the bottom plate. This pin projects into a vertical opening 48 in said arm for the purpose of holding it and said bottom plate against rotation relative to the corresponding finishing mold. An axial opening 49 extending upwardly into the bottom plate permits effective application of temperature regulating medium, such as cooling water, thereto. It will be observed that the upper surface of the arm 46 upon which the mold bottom plate normally rests is disposed at such an elevation that the corresponding bottom plate is so located that closing of the mold brings the converging or tapered surface 39 of the mold into engagement with the corresponding tapered surface 39a on the periphery of the bottom plate whereby said bottom plate is elevated to its proper position solely by the closing movement of the mold.

As each finishing mold approaches the article removing station "R" it is opened by means including the stationary cam 38 referred to heretofore. This would ordinarily leave the corresponding bottom plate free to move downwardly to its lowermost position where it would rest upon the arm 46. Such downward movement of the plate at this point would be objectionable because it would move the upper end of the bottle downward to a point at which it could not be engaged by the take-out mechanism "M". Accordingly an arcuate stationary track 50 extends horizontally along the path of travel of the finishing molds in proximity to and in advance of the article removing station "R". This track supports the bottom plates against appreciable downward movement until they reach the article removing station where an elevating mechanism 51 momentarily performs the function previously performed by the track.

The elevating mechanism consists of a disk 52 or plate mounted at the upper end of a piston rod 53 which at its lower end is connected to a piston 54 enclosed in a vertical motor cylinder 55. Incidentally the stationary track 50 just referred to may, as shown, be rigidly attached to this motor cylinder 55. The motor is so operated with respect to movement of the molds and take-out mechanism "M" that the bottom plate supporting disk 52 is moved downwardly out of supporting engagement with the bottom plate immediately upon completion of engagement between the take-out mechanism and the finished bottle.

Figures 10, 11:
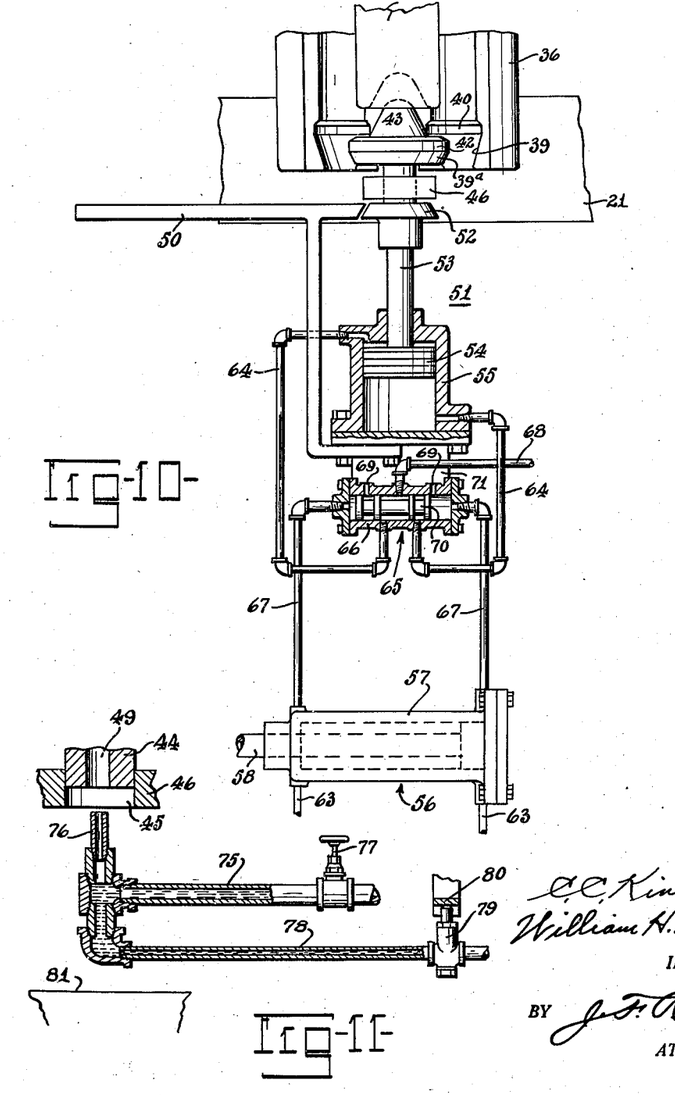
Fig. 10 is a sectional elevational view, partly diagrammatic, showing the operating connection between the elevator for the mold bottom plate and the take-out mechanism for removing bottles from the finishing mold.
Fig. 11 is a detail sectional elevational view of the apparatus for cooling the mold bottom plates.

Synchronized operation of the take-out mechanism and the bottom plate supporting mechanism 51 is operated by control apparatus of substantially the following construction. The take-out mechanism "M" may well be of conventional form as illustrated and consist of a horizontal motor 56 including a cylinder 57 and piston rod 58, the latter carrying a tongs unit 59. This tongs unit may consist of a vertical piston motor 60 and tongs 61 at the lower end of a piston rod 62. Air under pressure is supplied through pipes 63 to the opposite ends of the motor cylinder 57 in alternation and in timed relation to the step-by-step movements of the mold tables and opening of the finishing mold. Air under pressure is supplied to the opposite ends of the motor cylinder 55 of the bottom plate supporting mechanism 51 by way of pipes 64. A spool valve mechanism 65 functions as a control device for synchronizing the operations of these two mechanisms. This spool valve device includes a cylinder 66 closed at both ends and connected at these ends with pipes 67 leading to the opposite ends of the cylinder 57 of the take-out mechanism. A supply pipe 68 for air under pressure opens into the cylinder 66 substantially midway its length, the pipes 64 referred to heretofore in connection with the motor cylinder 55 being connected to the cylinder 66 at points spaced from the supply pipe 68. Exhaust ports 69 are provided adjacent the opposite ends of the cylinder. A spool valve 70 is arranged within the cylinder and is so constructed that when it is positioned at one end of the cylinder 66 it establishes communication between the supply pipe 68 and one end of the motor, the operation of which it is controlling, and simultaneously connects the other end of said motor to one of the exhaust ports 69. Movement of the spool valve to the opposite end of the cylinder 66 effects a reversal of the operation of said motor.

The spool valve device 65 may well be suspended from the lower end of the motor cylinder 55 by means of a bracket 71 and the entire unit including this device and the motor cylinder 55 may be adjustably supported on a vertical post 72 rising from the base 23. A split sleeve 73 provides adjustable connection between the motor cylinder 55 and said post. A machine conveyor 74 has its receiving end disposed in proximity to the article removing station "R" so that the take-out mechanism may transfer the finished bottles from the molds to said conveyor for transportation to an annealing leer (not shown).

An indicated heretofore a temperature regulating medium may be applied to the mold bottom plates at one or more of the stations where the molds are brought to a standstill. The device employed in this connection in the present invention provides for cooling the bottom plates and to this end consists of a water supply pipe 75 arranged beneath the finishing mold table 21 and terminating in an upwardly directed nozzle 76 which registers with the openings 49 in the bottom plates in succession as they are brought to a standstill at one of the stations. A valve 77 in said supply pipe 75 regulates the flow of water or other temperature regulating medium to the nozzle. An air pressure supply pipe 78 is connected at its outer end to the base of the nozzle and at its inner end is provided with a valve 79 which is periodically opened by cams 80 carried by the finishing mold table 21. These cams 80 which are individual to the finishing molds, open the valve 79 at the time the molds are brought into register with the nozzle 76 with the result that air under pressure discharges the water from the pipes 75 and 78, the discharged water being directed into the opening 49 in the bottom plates. The water applied to the bottom plates then flows into a funnel 81 or the like, and thence to a discharge pipe 82, from which it may be carried to any suitable receptacle.

In operation, the blanks or parisons which are formed in the molds on the blank mold table are at regular time intervals suspended bare from the neck molds at the blank transferring station "T" between the two mold tables. The blank forming units are such that they create a recess in the bottom end of the blanks or parisons, this recess being in register with one of the finishing mold bottom plates at said transferring station. Immediately after the tables are brought to a standstill the motor 37 is operated to close one of the finishing molds about the blank and substantially simultaneously with completion of the mold closing operation the neck mold is opened, thereby leaving the blank or parison entirely supported in the finishing mold. During the closing movement of the finishing mold the cam surfaces 39 engage the corresponding surfaces 39ᵃ on the bottom plate with the result that simultaneously with completion of the mold closing operation the bottom plate will have been elevated to its uppermost position. The tables are then indexed in the usual manner. At one of the stations of rest, a blowing mechanism 85 is operated to expand the parison to the final shape of the finished article. At the next succeeding station a spray of cooling water or other temperature regulating medium may be applied to the bottom plate through operation of the device described heretofore. As the finishing mold approaches the article removing station "R" it is opened by the cam 38. The arcuate track 50 supports the bottom plate against appreciable downward movement until it reaches the station "R" where the motor operated disk 52 serves to support this bottom plate. The take-out mechanism is now operated to bring the tongs 61 into supporting engagement with the finished bottle and immediately after such engagement this mechanism lifts the bottle vertically relative to the bottom plate and then carries it horizontally to a position over the machine conveyor 74. Immediately after firm engagement of the tongs with the bottle and lifting of said bottle, the motor 56 of the take-out mechanism is operated to project the tongs with the bottle to a position over the conveyor 74. At the time air is supplied to the inner end of the motor cylinder 57 it flows simultaneously to the spool valve cylinder 66 so that the valve 70 is shifted to the position shown in Fig. 10. As a result air under pressure flows through the pipes 68 and 64 to the upper end of the motor cylinder 55 and lowers the bottom plate supporting disk 52 slightly ahead of the actual outward movement of the tongs with the bottle. Thus the bottom plate is allowed to drop sufficiently to insure clearance between the plunger portion thereof and the bottom end of the bottle. Later, upon return of the tongs 61 to the article engaging position the spool valve is reversed with the result that the bottom plate supporting disk 52 is again moved upwardly to the position shown in Fig. 10.

Figures 12, 13, 14:
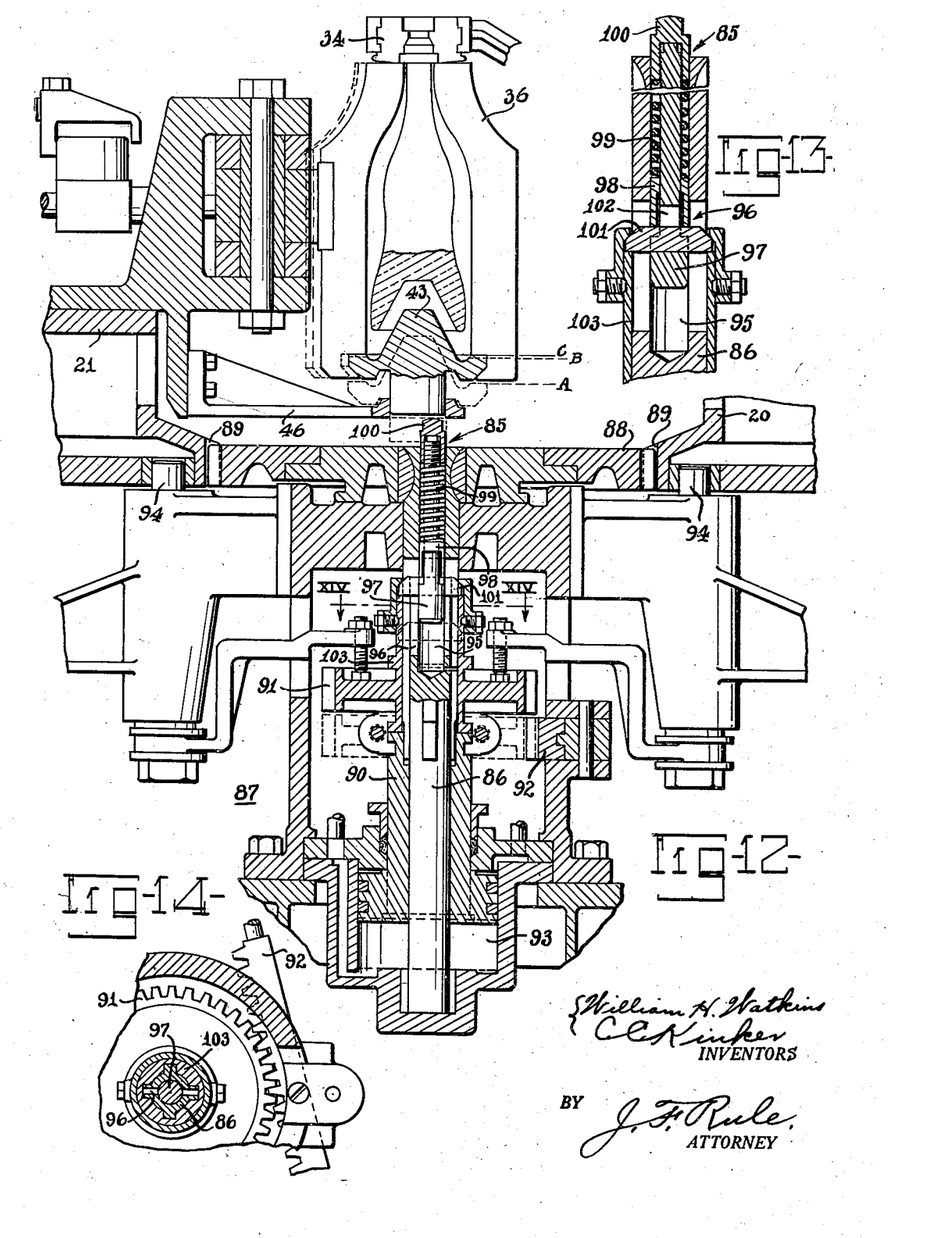
Fig. 12 is a vertical sectional elevation view.
Fig. 13 is a detail sectional view of the bottom plate engaging end of the raising mechanism.
Fig. 14 is a fragmentary sectional view taken along the plane of line XIV—XIV of Fig. 12.

In Figs. 12, 13, and 14, we have shown another means for raising the mold bottom plates 42 at the blank transferring station. This means consists of a yielding push rod 85 disposed axially of and slidingly mounted in the shaft 86 of the table indexing or driving mechanism 87 which incidentally may well be of the form shown in Fig. 2 of the Lynch patent referred to herein. This shaft 86 carries a gear 88 at its upper end for driving engagement with ring gears 89 on the mold table. A tubular shaft 90 is telescoped over and splined to said shaft 86 and carries a pinion 91 adapted to have operative connection to a rack 92 at regular time intervals. A piston motor 93 connected to the lower end of the tubular shaft is operable to reciprocate the latter and thereby periodically disengage the pinion from said rack. This is necessary so that the rack may move in one direction independently of the pinion and effect rotation of the tables in one direction only. Incidentally such lifting of the pinion correspondingly raises a pair of locking pins 94 into engagement with the mold tables. Mounting of the push rod 85 in the shafts so that upward movement of the pinion 91 similarly moves the rod includes substantially the following construction. The shaft 86 is formed with an axial passageway 95 opening through the upper end and with a pair of opposed vertical slots 96 near the lower end of said passageway. The push rod which is slidingly disposed in this passageway includes an enlarged lower end 97 or head, a collar 98 freely resting upon said head, a coil spring 99 on the rod above the head, and a removable cap 100 threaded on the upper end of the rod. A bar 101 extending through a diametrical slot 102 in the rod has its ends projecting through the slots 96 into the shaft 86 and secured to the upper end of a sleeve 103 rising from the hub of the pinion 91 with the result that upward movement of the latter correspondingly moves the push rod 85.

Since such lifting of the pinion is effected with each indexing operation and just prior to closing of the finishing molds 36, it is apparent that the bottom plates will be properly positioned in time to insure the necessary cooperation between the plates and molds. In Fig. 12, dotted line A indicates the lowermost position of the bottom plates at the blank transferring station; dotted line B, the position to which these plates are elevated by the push rod; and full line C, the position to which the plates are elevated by closing of the molds about them.

Modifications may be resorted to within the spirit and scope of the appended claims.

What we claim is:

1. In combination, an annular series of partible finishing molds mounted for rotation about a vertical axis whereby they are brought in succession to blank transferring and article removing stations, bottom plate holders individual to and moving with the molds, a bottom plate mounted in each holder for free vertical movement relative thereto, said mold and bottom plate having cooperating faces which during closing of the mold at the transferring station lift the bottom plate to its uppermost position, means for closing the molds at the blank transferring station, means for opening the molds as they approach the article removing station, means supporting the mold bottom plates against appreciable dropping during and for a predetermined period following opening of the molds in advance of arrival at the article removing station, and separate bottom plate supporting means holding the plates against dropping during a predetermined period of the time the molds occupy the article discharging station and then allowing the plates to move to their lowermost position.

2. In combination, an annular series of partible finishing molds mounted for rotation about a vertical axis whereby they are brought in succession to blank transferring and article removing stations, bottom plate holders individual to and moving with the molds, a bottom plate mounted in each holder for free vertical movement relative thereto, said mold and bottom plate having cooperating faces which during closing of the mold at the transferring station lift the bottom plate to its uppermost position, means for closing the molds at the lank transferring station, means for opening the molds as they approach the article removing station, a track arranged to support the mold bottom plates against appreciable dropping during opening of the molds, separate bottom plate supporting means at the article discharging station including a plate adapted for engagement with the bottom plates one at a time, and means for lowering said plates periodically and thereby permitting the bottom plates to move by gravity to their lowermost position.

3. In combination, an annular series of partible finishing molds mounted for rotation about a vertical axis whereby they are brought in succession to blank transferring and article removing stations, bottom plate holders individual to and moving with the molds, a bottom plate mounted in each holder for free vertical movement relative thereto, said mold and bottom plate having cooperating faces which during closing of the mold at the transferring station lift the bottom plate to its uppermost position, means for closing the molds at the blank transferring station, means for opening the molds as they approach the article removing station, a track arranged to support the mold bottom plates against appreciable dropping during opening of the molds, means at the article removing station for momentarily supporting the bottom plates against downward movement, automatic means for removing articles from the molds at said article removing station, and means whereby operation of said automatic article removing means causes lowering of the mold bottom plate support at said article removing station.

4. In combination, an annular series of partible finishing molds mounted for rotation about a vertical axis, means for moving said molds and thereby bringing them in succession to blank transferring and article removing stations, a mold bottom plate holder for each mold, a bottom plate mounted in each holder for free vertical movement therein, means for opening and closing the mold, means for raising the bottom plates into operative relation to the corresponding molds at the blank transferring station, means for supporting the bottom plates against appreciable downward movement during and for a predetermined period of time following opening of the mold, take-out mechanism for removing articles from the molds at the article removing stations, and means whereby actuation of the take-out mechanism causes a predetermined degree of downward movement of the bottom plates one at a time at the article removing station.

5. In combination, an annular series of partible finishing molds mounted for rotation about a vertical axis, means for moving said molds and thereby bringing them in succession to blank transferring and article removing stations, a mold bottom plate holder for each mold, a bottom plate mounted in each holder for free vertical movement therein, means for opening and closing the mold, means for raising the bottom plates into operative relation to the corresponding molds at the blank transferring station, means for supporting the bottom plates against appreciable downward movement during and for a predetermined period of time following opening of the mold, means permanently located at the article removing station for holding the bottom plates against appreciable downward movement after complete opening of the molds and means whereby the bottom plates may be permitted to move downwardly after opening of the molds and prior to movement of the molds away from said article removing station.

6. In combination, an annular series of partible finishing molds mounted for rotation about a vertical axis whereby they are brought in succession to blank transferring and article removing stations, bottom plate holders individual to and moving with the molds, a bottom plate mounted for free vertical movement in each holder, means whereby closing of a finishing mold about said bottom plate at the blank transferring station elevates said plate into cooperative relation with the corresponding mold, means for closing the mold at the transferring station, means for opening the mold in proximity to and in advance of the article removing station, means for removing a finished article from the mold at said article removing station, means for supporting the bottom plate against appreciable downward movement during opening of the mold, and means operating in timed relation with actuation of the article removing means for lowering at least a part of the bottom plate supporting means.

7. In combination, an annular series of partible finishing molds mounted for rotation about a vertical axis whereby they are brought in succession to blank transferring and article removing stations, bottom plate holders individual to and moving with the molds, a bottom plate mounted for free vertical movement in each holder, means whereby closing of a finishing mold about said bottom plate at the blank transferring station elevates said plate into cooperative relation with the corresponding mold, means for closing the mold at the transferring station, means for opening the mold in proximity to and in advance of the article removing station, take-out mechanism for removing an article from the finishing mold at said article removing station, a stationary track for supporting the bottom plate during and for a predetermined period of time following opening of the finishing mold, a motor operated disk for supporting the bottom plate at the article removing station, and means for synchronizing operation of the take-out mechanism and motor operated disk whereby the bottom plate is lowered immediately following engagement of the take-out mechanism with the finished article.

8. In combination, an annular series of partible finishing molds mounted for rotation about a vertical axis whereby they are brought in succession to blank transferring and article removing stations, bottom plate holders individual to and moving with the molds, a bottom plate mounted for free vertical movement in each holder, means whereby closing of a finishing mold about said bottom plate at the blank transferring station elevates said plate into cooperative relation with the corresponding mold, means for closing the mold at the transferring station, means for opening the mold in proximity to and in advance of the article removing station, take-out mechanism for removing an article from the finishing mold at said article removing station, a stationary track for supporting the bottom plate during and for a predetermined period of time following opening of the finishing mold, a motor operated disk for supporting the bottom plate at the article removing station, means for synchronizing operation of the take-out mechanism and motor operated disk whereby the bottom plate is lowered immediately following engagement of the take-out mechanism with the finished article, said synchronizing means including a reversing valve controlling operation of the motor, and means whereby actuation of the take-out mechanism operates said reversing valve.

9. In combination, an annular series of partible finishing molds mounted for rotation about a vertical axis whereby they are brought in succession to blank transferring and article removing stations, bottom plate holders individual to and moving with the molds, a bottom plate mounted for free vertical movement in each holder, means whereby closing of a finishing mold about said bottom plate at the blank transferring station elevates said plate into cooperative relation with the corresponding mold, means for closing the mold at the transferring station, means for opening the mold in proximity to and in advance of the article removing station, take-out mechanism for removing an article from the finishing mold at said article removing station, a stationary track for supporting the bottom plate during and for a predetermined period of time following opening of the finishing mold, a vertically movable disk for supporting the bottom plate at said article removing station, a fluid operated piston motor for moving the disk vertically into and out of position to support said plates, and a reversing valve actuated by operation of the take-out mechanism for periodically reversing the operation of the motor.

10. In combination, a partible finishing mold comprising a pair of sections pivoted together, means for moving said sections to thereby alternately open and close the mold, a bottom plate holder spaced below the mold and having a vertical opening therein, and a bottom plate having a guide member projecting downwardly into said opening, said mold sections and bottom plate having cam surfaces which cooperate during closing of the mold to elevate the plate to its operative position.

11. In combination, an annular series of partible finishing molds mounted for rotation about a vertical axis whereby they are brought in succession to a plurality of stations, bottom plates individual to and moving with the molds, each bottom plate having a downwardly facing recess in its lower surface, means for imparting step-by-step movement to said molds whereby they are brought to a standstill at said stations, an apparatus for directing a temperature regulating medium into the recesses of the bottom plates after the molds are brought to a standstill at one of said stations, devices individual to the molds and traveling therewith for controlling operation of said apparatus, said apparatus including an upwardly directed nozzle which registers with the recesses as the molds come to a standstill thereabove, means for causing constant flow of a temperature regulating medium to said nozzle, an air pressure supply pipe connected to the nozzle, a valve in said air supply pipe, and cams individual to the molds for opening the valve periodically whereby air under pressure discharges the temperature regulating medium through said nozzle.

12. In combination, blank and finishing mold tables arranged side by side for rotation about separate vertical axes, partible molds on said tables adapted to be brought by rotation of the latter to a blank transferring station, vertically movable bottom plates for molds on one table, ring gears carried by said tables, a driving gear interposed between the tables and having driving connection to the ring gears, a tubular shaft connected to and extending through said driving gear, a push rod slidingly disposed within the shaft, a pinion mounted upon said shaft, means for rotating the pinion at regular time intervals to thereby impart a step-by-step movement to the mold tables and bring the bottom plates one at a time into register with said push rod, means for imparting upward movement to the pinion periodically, means whereby such upward movement of the pinion correspondingly moves the push rod causing elevation of the bottom plates one at a time, and means for closing certain of the molds at the blank transferring station.

13. In combination, blank and finishing mold tables arranged side by side for rotation about separate vertical axes, partible molds on said tables adapted to be brought by rotation of the latter to a blank transferring station, vertically movable bottom plates for molds on one table, ring gears carried by said tables, a driving gear interposed between the tables and having driving connection to the ring gears, a tubular shaft connected to and extending through said driving gear, a push rod slidingly disposed within the shaft, a pinion mounted upon said shaft, means for rotating the pinion at regular time intervals to thereby impart a step-by-step movement to the mold tables and bring the bottom plates one at a time into register with said push rod, means for imparting upward movement to the pinion periodically, a coil spring encircling said push rod, a collar freely slidable on the push rod and engaging the lower end of the spring, means providing such connection between the pinion and collar that upward movement of the pinion correspondingly moves the push rod and elevates the bottom plates one at a time, and means for closing certain of the molds at the blank transferring station.

WILLIAM H. WATKINS.
CLARENCE C. KINKER.